United States Patent
Chen et al.

(10) Patent No.: US 6,924,604 B2
(45) Date of Patent: Aug. 2, 2005

(54) METHOD OF OPERATING A DISCHARGE LAMP SYSTEM AND A DISCHARGE LAMP SYSTEM USING A COMBINATION RADIAL AND LONGITUDINAL ACOUSTIC MODE TO REDUCE VERTICAL SEGREGATION

(75) Inventors: Nancy H. Chen, Salem, MA (US); Scott J. Butler, North Oxford, MA (US); Joseph A. Olsen, Gloucester, MA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/670,647

(22) Filed: Sep. 25, 2003

(65) Prior Publication Data

US 2005/0067975 A1 Mar. 31, 2005

(51) Int. Cl.[7] .............................................. H05B 37/02
(52) U.S. Cl. .................... 315/209 R; 315/291; 315/307
(58) Field of Search .............................. 315/209 R, 246, 315/291, 307, 360, DIG. 7

(56) References Cited

U.S. PATENT DOCUMENTS

| | | | | |
|---|---|---|---|---|
| 5,684,367 A | * | 11/1997 | Moskowitz et al. | ........ 315/246 |
| 5,880,561 A | * | 3/1999 | Miyazaki et al. | ....... 315/209 R |
| 6,124,683 A | | 9/2000 | Olsen et al. | ................. 315/291 |
| 6,147,461 A | * | 11/2000 | Kominami et al. | ......... 315/291 |
| 6,184,633 B1 | | 2/2001 | Kramer | ...................... 315/246 |
| 6,400,100 B1 | * | 6/2002 | Kramer | ...................... 315/291 |
| 6,437,517 B1 | | 8/2002 | Kramer | ...................... 315/246 |
| 6,483,259 B1 | * | 11/2002 | Kramer | ...................... 315/291 |
| 6,522,089 B1 | * | 2/2003 | Duong et al. | ............... 315/308 |
| 6,788,007 B2 | * | 9/2004 | Kramer | ...................... 315/246 |

* cited by examiner

Primary Examiner—Thuy Vinh Tran
(74) Attorney, Agent, or Firm—Carlo S. Bessone

(57) ABSTRACT

A discharge lamp system and method of operating a discharge lamp system in which vertical segregation of vapor phase species is reduced. Lamp power is modulated with an arc-straightening frequency and with a frequency that excites a combination radial plus longitudinal acoustic mode of the lamp. The combination radial plus longitudinal acoustic mode may be a combination first radial mode and nth longitudinal acoustic mode and may be excited with a single power frequency or a swept power frequency range. The two frequencies may be provided at the same time, or separately where the modulation at the arc-straightening frequency is 2 to 16 times longer than a subsequent modulation at the combination radial plus longitudinal acoustic mode.

19 Claims, 3 Drawing Sheets

US 6,924,604 B2

METHOD OF OPERATING A DISCHARGE LAMP SYSTEM AND A DISCHARGE LAMP SYSTEM USING A COMBINATION RADIAL AND LONGITUDINAL ACOUSTIC MODE TO REDUCE VERTICAL SEGREGATION

BACKGROUND OF THE INVENTION

The present invention is directed to a method of operating a discharge lamp system and a discharge lamp system in which vertical segregation is reduced.

Vertical operation of a discharge lamp system can lead to vertical segregation of vapor phase species, which in turn leads to color separation over the length of the lamp, reduced light output, local overheating of the lamp wall, and other problems that may cause premature lamp failure or unsatisfactory lamp performance. This is particularly true for high aspect ratio lamps (lamps whose length to width ratio is high).

A solution to this problem is proposed in U.S. Pat. No. 6,124,683 in which an arc in a discharge lamp is straightened by acoustic modulation of lamp power. Such power modulation can also provide some control over vertical segregation during vertical operation of the lamp.

As is now known, modulation of lamp power causes modulation of the arc temperature distribution and, as a result, modulation of the gas pressure distribution throughout the lamp. Certain frequencies of modulation cause standing wave oscillation of the gas pressure in the discharge tube of the lamp system. Acoustic modes in discharge lamp systems are generally determined based on a cylinder of a size comparable to the discharge tube of the lamp. If the pressure has a spatial dependence along the axis of the tube, then the acoustic mode is longitudinal. The number of half wavelengths determines the particular mode number. If there are two half wavelengths, the lamp is operating at the second longitudinal mode. If the pressure has a spatial dependence along the radius of the tube, then the acoustic mode is radial, and if the pressure has a spatial dependence around the circumference of the tube, then the acoustic mode is azimuthal. Combination acoustic modes are also possible, such as the radial-longitudinal mode and the azimuthal-longitudinal mode, in which the pressure distribution depends on more than one coordinate. These combination modes can be further defined, depending on the number of half wavelengths, such as a combination acoustic mode of the third azimuthal and second longitudinal modes.

The frequencies for each of these acoustic modes (the resonance frequencies) are determinable from the dimensions of the discharge tube and the speed of sound in the gas phase of the lamp. The speed of sound has a temperature dependence and the arc temperature profile can depend on position. Nevertheless, the resonance frequencies can be reasonably estimated using an isothermal cylindrical model.

The longitudinal mode frequencies are roughly $$f_{nL}=(nC)/(2\text{Length}),$$

where $f_{nL}$ is the nth longitudinal mode, C is the average speed of sound, and Length is the cavity length.

The radial mode frequencies are roughly $$f_{nR}=(k_{nR}C)/(\pi D)$$

where $f_{nR}$ is the nth radial mode, $k_{nR}$ is a constant that is known for each radial mode (it is 3.83 for the first radial mode and higher for subsequent modes), C is the average speed of sound, and D is the diameter of the cavity.

The azimuthal mode frequencies are roughly $$f_{nA}=(k_{nA}C)/(\pi D)$$

where $f_{nA}$ is the nth azimuthal mode, $k_{nA}$ is a constant that is known for each azimuthal mode (it is 1.84 for the first azimuthal mode, 3.05 for the second, 4.20 for the third and higher for subsequent modes), C is the average speed of sound, and D is the diameter of the cavity.

Better estimates of the resonance frequencies can be obtained from finite element calculations of the eigenmodes of vessels approximating the shape of the cavity in which the arc is formed using well estimated temperature and composition distributions.

Still other methods of estimation are possible. For example, for a radial acoustic mode, the continuous radial sound speed profile can be discretized into iso-speed concentric cylinders. A characteristic time can be calculated for each cylinder by inverting the first radial resonant frequency for that cylinder. The composite characteristic time can be calculated from the sum of the individual cylinder's characteristic times. The refined estimate of the frequency of the first radial acoustic mode can be calculated from the inverted composite characteristic time.

Further, the resonance frequencies can be tuned based on visual clues such as accumulation of salt fill in patterns on the walls of the arc tube, and the disappearance of color separation. For example, salt rings may appear around the tube when the frequencies are properly tuned to longitudinal resonances.

Combination modes can be determined by combining the frequencies of the individual modes in quadrature so long as one of the modes is longitudinal. For example, the resonance frequency of the first radial and fourth longitudinal combination mode is $$f_{1R4L}^2=f_{1R}^2+f_{4L}^2.$$

The frequencies discussed herein are the power modulation frequencies (denoted herein "power frequencies"). For a sine waveform, the corresponding current (or voltage) frequencies are one-half the power frequencies.

With reference again to the prior art, a further solution to the problem of vertical segregation is offered in U.S. Pat. No. 6,184,633. As shown in FIG. 1, the lamp power is modulated in a repeating pattern of a sine wave sweeping over a frequency range 10 that is appropriate for arc-straightening and a lower frequency 12 corresponding to a longitudinal mode. The swept power frequency range is 90–110 kHz and the power frequency of the longitudinal mode is 24.5 kHz (the current frequencies being one-half these power frequencies). This improved control over the arc, but the lower frequency is difficult to generate efficiently and is too close to audio frequencies.

A further improvement is offered in U.S. Pat. No. 6,437,517 in which the repeating pattern of FIG. 1 is the same, except the lower frequency is replaced with a frequency higher than the arc-straightening frequency sweep. The higher frequency can be a single frequency or may sweep over a frequency range. The higher frequency excites a combination acoustic mode that combines the azimuthal mode (specifically, the third azimuthal mode or higher) and the longitudinal mode (specifically, the nth longitudinal mode). For a lamp 19 mm long and with an inner diameter of 4 mm, the arc-straightening frequency range is 90–110 kHz, the combination mode is centered on 150 kHz (±10 kHz) and the pattern is repeated at about 100 Hz. Due to its symmetry, this combination acoustic mode of the azimuthal and longitudinal modes is still difficult to excite and the present inventors have sought a suitable substitute combination acoustic mode that is easier to excite.

SUMMARY OF THE INVENTION

An object of the present invention is to provide a novel lamp system and method of operating a discharge lamp system in which the combination acoustic mode is easier to excite than in the prior art.

A further object of the present invention is to provide a novel lamp system and method in which the combination acoustic mode is a combination radial plus longitudinal mode.

A yet further object of the present invention is to provide a novel lamp system and method of operating a discharge lamp system in which lamp power is modulated with an arc-straightening frequency and with a frequency that excites a combination radial plus longitudinal mode of the lamp.

Another object of the present invention is to provide a novel lamp system and method in which the combination radial plus longitudinal mode is a combination of a first radial mode and an nth longitudinal mode, where "n" is preferably even and more preferably is one of 2, 4, and 6.

Yet another object of the present invention is to provide a novel discharge lamp with a first generator that modulates lamp power with an arc-straightening frequency and a second generator that modulates lamp power at a frequency that excites a combination radial plus longitudinal mode of the lamp.

These and other objects and advantages of the invention will be apparent to those of skill in the art of the present invention after consideration of the following drawings and description of preferred embodiments.

DESCRIPTION OF PREFERRED EMBODIMENTS

Figure 2:
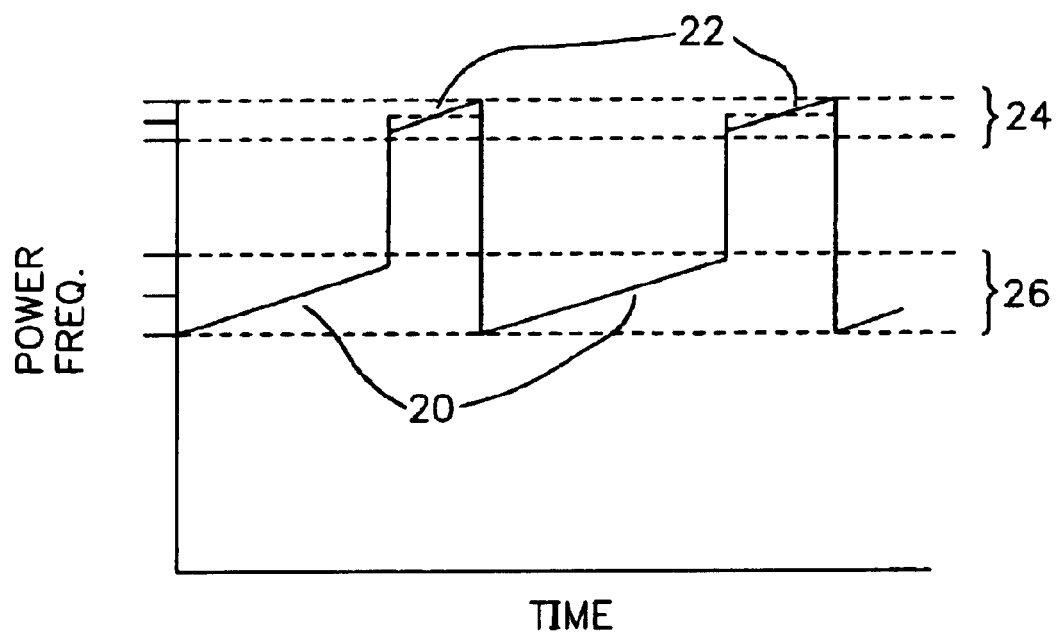
FIG. 2 is a graph depicting a discharge lamp system power frequency modulation sequence of an embodiment of the present invention.
Figure 1:
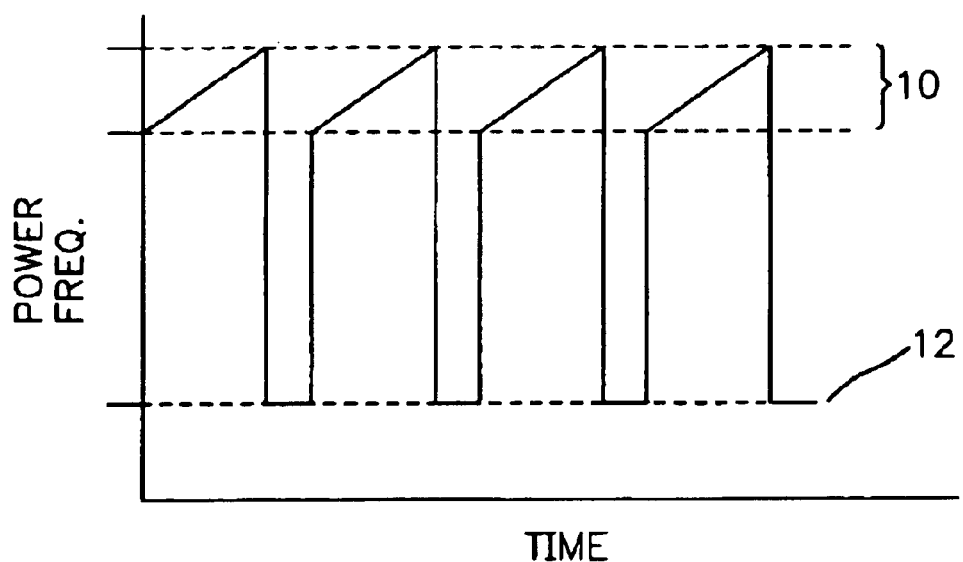
FIG. 1 is a graph depicting a prior art discharge lamp system power frequency modulation sequence.

The present invention is a discharge lamp system and a method of operating a discharge lamp system in which vertical segregation of vapor phase species is reduced. Lamp power is modulated with an arc-straightening frequency and with a frequency that excites a combination radial plus longitudinal acoustic mode of the lamp. These two frequencies may be provided at the same time or, as depicted in FIG. 2, the arc-straightening frequency 20 may be provided in plural separate bands, which may be frequency sweeps, and the frequency 22 that excites a combination radial plus longitudinal acoustic mode of the lamp may be provided between the separate bands.

The inventors have determined that the combination radial-longitudinal acoustic mode is easier to excite than a combination azimuthal-longitudinal acoustic mode in a cylindrical discharge lamp system and thus the present invention provides an improvement over the above-identified references.

In a preferred embodiment, the combination radial plus longitudinal mode is a combination of a first radial mode and an nth longitudinal mode, where is "n" is preferably even (based on symmetry arguments) and more preferably is 2, 4, or 6. The combination acoustic mode may be excited with a single power frequency (such as shown by the dashed horizontal line at 22) or a swept power frequency range 24 (such as shown by the slanted lines at 22). The swept frequency range may be small, on the order of 1 kHz. For a lamp having a discharge cavity that has a 3.7 mm center inner diameter tapering to 3.0 mm at the ends and a 23 mm length, 12 kHz excites the first longitudinal mode, 139 kHz excites the second azimuthal mode, 175 kHz excites the first radial mode, and the combination radial-longitudinal acoustic mode is excited by a frequency 22 that is within a power frequency range of one of 179–182 kHz and 188–190 kHz, depending on "n".

The arc-straightening frequency 20 preferably excites a second azimuthal mode, or a combination second azimuthal mode and a longitudinal mode (preferably an even number) of the lamp. The frequency 20 may be in a range 26, and for the above-noted lamp, the power frequency band is about 15 kHz wide and within the range of 130–150 kHz.

When the arc-straightening frequency 20 is provided in separate bands, the time period of each of the arc-straightening frequency bands may be 2 to 16 times longer than a subsequent modulation at the combination radial plus longitudinal acoustic mode of the lamp by the frequency 22. For example, the arc-straightening frequency bands may be 2–9 ms long and the excitation of the combination acoustic mode 22 may be 0.2–5 ms long. Other combinations and lengths are also available, and in one embodiment, the cycle is operated at about 200 Hz so that each cycle is 5 ms in length, where the arc-straightening frequency bands are each 4.7 ms and the periods in which the combination acoustic mode is excited are each 0.3 ms.

Figure 3:
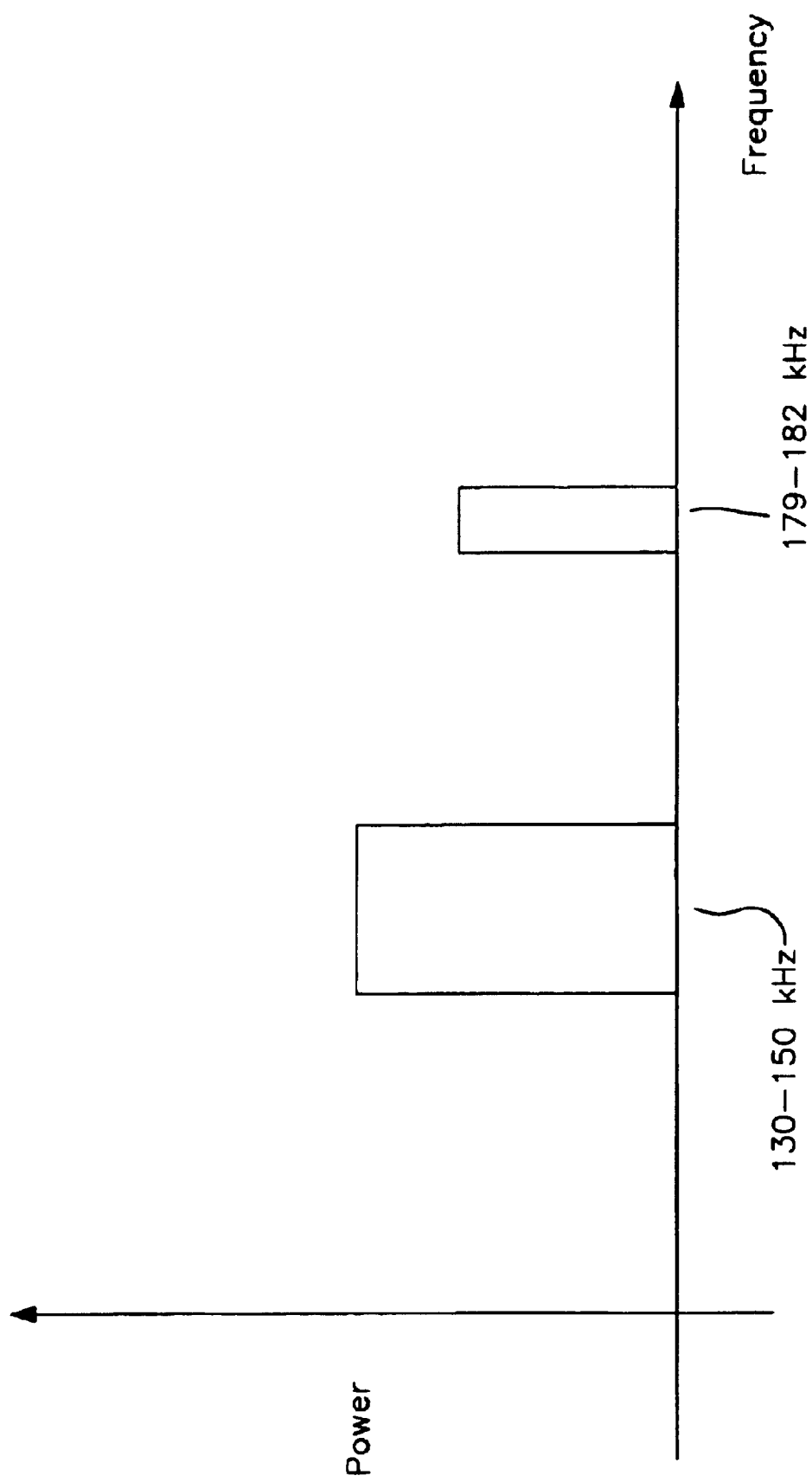
FIG. 3 depicts a power spectrum of for an embodiment of the present invention in which the arc-straightening frequency and frequency that excites the combination acoustic mode are provided at the same time.

When the arc-straightening frequency and the frequency that excites the combination acoustic mode are provided at the same time, the signal may have a power spectrum such as depicted in FIG. 3.

Figure 4:
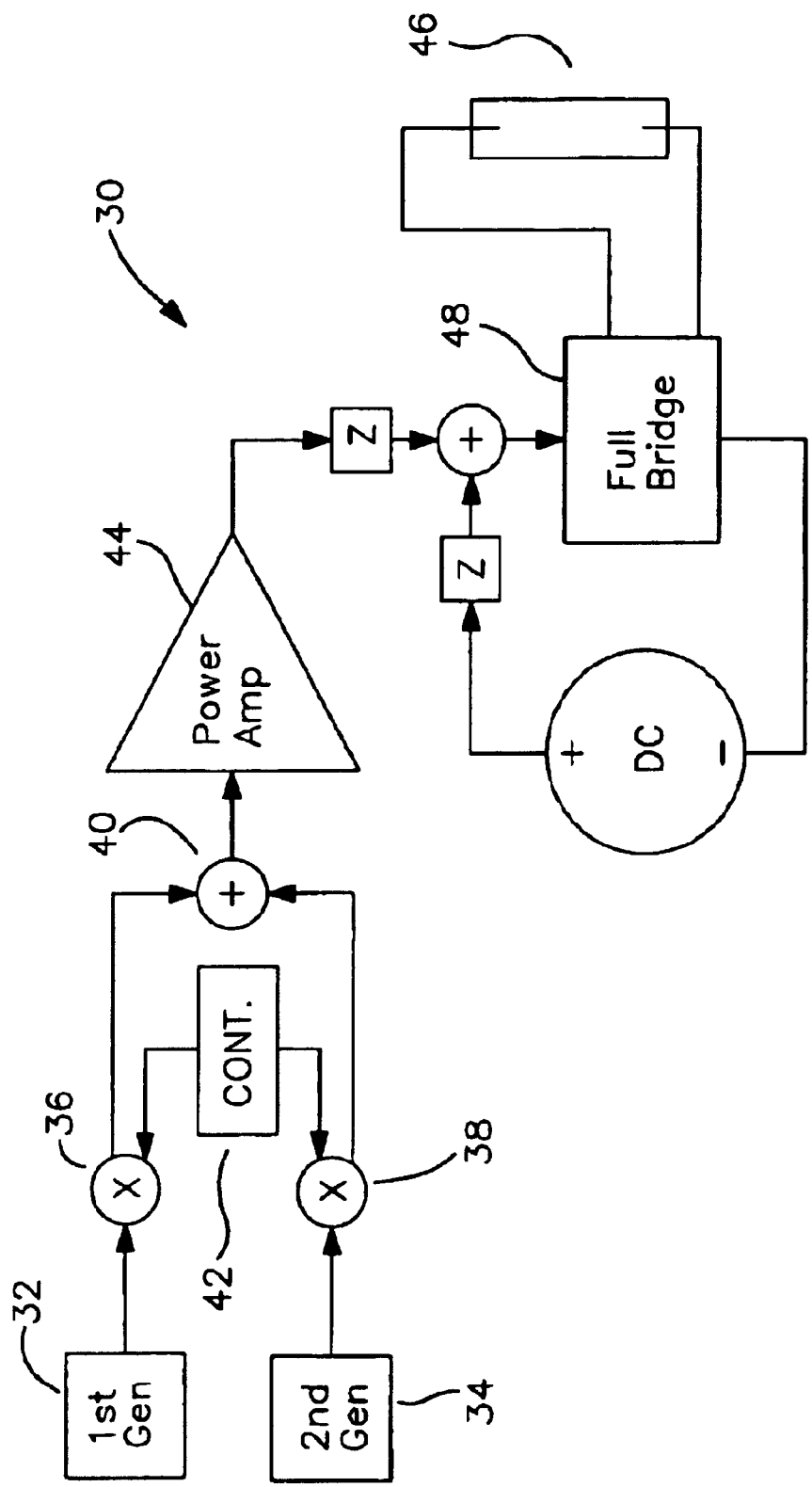
FIG. 4 is a schematic diagram of an embodiment of a circuit for a discharge lamp system of the present invention.

With reference now to FIG. 4, a circuit 30 for a discharge lamp system of a preferred embodiment includes a first generator 32 that modulates lamp power with an arc-straightening frequency and a second generator 34 that modulates lamp power at a combination radial plus longitudinal acoustic mode of the lamp. Each first and second generator 32, 34 may provide sine wave voltages. These generators may provide voltages in known waveforms using known techniques, including the one described in U.S. Pat. No. 6,522,089, which is incorporated by reference.

The lamp 30 may also include a first multiplier 36 providing a signal from first generator 32, a second multiplier 38 providing a signal from second generator 34, an adder 40 for combining signals from first and second multipliers 36, 38, and a controller 42 for providing a non-zero multiple to only one of first and second multipliers 36, 38 at a time, when the voltages from first and second generators 32 and 34 are to be provided in separate time periods. The non-zero multiple is a gating voltage for determining which signal is active. In a preferred embodiment, adder 40 provides the modulated power signals to an amplifier 44, which provides appropriate signals to electrodes of a discharge tube 46 through a full bridge 48.

While embodiments of the present invention have been described in the foregoing specification and drawings, it is to be understood that the present invention is defined by the following claims when read in light of the specification and drawings.

We claim:

1. A method of operating a discharge lamp system in which vertical segregation of vapor phase species is reduced, the method comprising the steps of providing a lamp, and modulating lamp power with an arc-straightening frequency and with a frequency that excites a combination radial plus longitudinal acoustic mode of the lamp, wherein each time period of the arc-straightening frequency is 2 to 16 times longer than a subsequent modulation at the combination radial plus longitudinal mode of the lamp.

2. The method of claim 1, wherein the arc-straightening frequency is provided in spaced apart time periods and the excitation of the combination radial plus longitudinal acoustic mode occurs between the arc-straightening frequency time periods.

3. The method of claim 1, wherein the excitation of the combination radial plus longitudinal acoustic mode is provided at the same time as the arc-straightening frequency.

4. The method of claim 1, wherein the combination radial plus longitudinal mode is a combination of a first radial mode and an nth longitudinal mode.

5. The method of claim 4, wherein "n" is one of 2, 4, and 6.

6. The method of claim 1, wherein the combination radial plus longitudinal mode is excited with a single power frequency.

7. The method of claim 1, wherein the combination radial plus longitudinal mode is excited with a swept power frequency range.

8. The method of claim 7, wherein the swept power frequency range includes a combination of a first radial mode and an nth longitudinal mode and is within a power frequency band about 1 kHz wide.

9. The method of claim 8, wherein the power frequency band is within the range of one of 179–182 kHz and 188–190 kHz.

10. The method of claim 1, wherein the arc-straightening frequency is in a power frequency band about 15 kHz wide that includes a frequency that excites a second azimuthal mode of the lamp.

11. The method of claim 10, wherein the power frequency band is within a range of 130–150 kHz.

12. A discharge lamp system with reduced vertical segregation of vapor phase species, comprising a lamp, a first generator that modulates lamp power with an arc-straightening frequency and a second generator that modulates lamp power at a combination radial plus longitudinal acoustic mode of the lamp, said first generator provides a range of frequencies that includes a second azimuthal mode of the lamp.

13. The lamp system of claim 12, further comprising a circuit with a first multiplier providing a signal from said first generator, a second multiplier providing a signal from said second generator, an adder for combining the signals from said first and second multipliers, and a controller for providing a non-zero multiple to only one of said first and second multipliers at a time.

14. The lamp system of claim 13, wherein said controller provides the non-zero multiple to said first generator during separate arc-straightening frequency periods that are 2 to 16 times longer than interleaved time periods when said second multiplier receives the non-zero multiple during modulation at the combination radial plus longitudinal mode of the lamp.

15. The lamp system of claim 12, wherein said second generator provides a signal that modulates lamp power at a combination of a first radial mode and an nth longitudinal mode.

16. The lamp system of claim 15, wherein "n" is one of 2, 4, and 6.

17. The lamp system of claim 12, wherein said second generator outputs a single frequency.

18. The lamp system of claim 12, wherein said second generator outputs a swept frequency range.

19. The lamp system of claim 18, wherein the swept frequency range excites a combination of a first radial mode and an nth longitudinal mode.

* * * * *